United States Patent
Jing

(10) Patent No.: US 9,541,799 B2
(45) Date of Patent: Jan. 10, 2017

(54) LIGHT SOURCE SYSTEM, ULTRAVIOLET CURING DEVICE AND CURING METHOD APPLICABLE TO DISPLAY PANEL

(71) Applicants: BOE TECHNOLOGY GROUP CO., LTD., Beijing (CN); HEFEI BOE OPTOELECTRONICS TECHNOLOGY CO., LTD., Hefei, Anhui (CN)

(72) Inventor: Yangkun Jing, Beijing (CN)

(73) Assignees: BOE TECHNOLOGY GROUP CO., LTD., Beijing (CN); HEFEI BOE OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 0 days.

(21) Appl. No.: 14/751,896

(22) Filed: Jun. 26, 2015

(65) Prior Publication Data
US 2016/0103344 A1    Apr. 14, 2016

(30) Foreign Application Priority Data
Oct. 14, 2014  (CN) .......................... 2014 1 0541786

(51) Int. Cl.
*A61N 5/06*     (2006.01)
*G02F 1/1339*   (2006.01)
*F21V 8/00*     (2006.01)

(52) U.S. Cl.
CPC ........... *G02F 1/1339* (2013.01); *G02B 6/0026* (2013.01); *G02B 6/0055* (2013.01)

(58) Field of Classification Search
CPC ............ G02F 1/00; G02F 1/0102; G02F 1/01; G02F 1/0105; C09D 11/101; B32B 2310/0831
USPC .................. 250/504 R, 493.1, 503.1, 492.1, 453.11, 250/455.11
See application file for complete search history.

(56) References Cited

U.S. PATENT DOCUMENTS

| 5,945,680 A * | 8/1999 | Jensen ...................... F26B 3/28 250/492.1 |
| 2006/0008744 A1* | 1/2006 | Hsiao ..................... G02F 1/1339 430/321 |
| 2007/0001612 A1* | 1/2007 | Bewlay ................... H01J 9/323 313/631 |

* cited by examiner

Primary Examiner — Jason McCormack
(74) Attorney, Agent, or Firm — Ladas & Parry LLP

(57) ABSTRACT

A light source system, an ultraviolet curing device and a curing method applicable to a display panel are provided. The light source system includes a light source assembly; a housing enclosing the light source assembly and having a first face, a second face and a third face, the first face having a first window, the second face having a second window, the third face being parallel to the display panel and located between the light source assembly and the display panel, and the third face having a third window; a first filter covering the first window, a second filter covering the second window and a third filter covering the third window; and a first reflecting element and a second reflecting element disposed outside the housing.

20 Claims, 4 Drawing Sheets

LIGHT SOURCE SYSTEM, ULTRAVIOLET CURING DEVICE AND CURING METHOD APPLICABLE TO DISPLAY PANEL

TECHNICAL FIELD

Embodiments of the present invention relate to a light source system, an ultraviolet curing device and a curing method applicable to a display panel.

BACKGROUND

In the cell-assembling process for a liquid crystal display panel, after aligning and bonding a color filter substrate and an array substrate with sealant, the sealant needs to be cured.

A curing process is typically as follows. The panel is placed on a platform of an ultraviolet curing device and is irradiated by a light-emitting-diode (LED) light supplement lamp to supply sufficient light for capturing alignment marks on the panel. Then an image sensor (Charge-Coupled Device, CCD) is used to capture alignment marks on the panel to align the panel with A mask disposed over the panel such that the mask just blocks the display area of the panel and expose margin frame area of the panel, so as to avoid adverse impacts on liquid crystal molecules and interior circuits due to direct radiation of display area by the ultraviolet light. After completing the alignment, the ultraviolet source over the panel is used to expose the margin frame area of the panel to cure the sealant rapidly under the action of the ultraviolet light.

SUMMARY

Embodiments of the present invention provide a light source system, a ultraviolet curing device and a curing method applicable to a display panel to reduce the probability of alignment alarm so that the panel is cured in time.

According to an aspect of the present invention, a light source system applicable to a display panel, including: a light source assembly; a housing enclosing the light source assembly and having a first face, a second face and a third face, the first face and the second face being parallel to each other and both perpendicular to the display panel to be cured, the first face having a first window, the second face having a second window, the third face being parallel to the display panel to be cured and located between the light source assembly and the display panel to be cured, and the third face having a third window; a first filter covering the first window, a second filter covering the second window and a third filter covering the third window; a first reflecting element and a second reflecting element disposed outside the housing, the first reflecting element having a reflecting surface inclined toward the display panel to be cured relative to the first face and having a vertical projection on the first face with an area greater than or equal to that of the first window, and the second reflecting element having a reflecting surface inclined toward the display panel to be cured relative to the second face and having a vertical projection on the second face with an area greater than or equal to that of the second window.

According to another aspect of the present invention, an ultraviolet curing device applicable to a display panel, including the light source system of the present embodiments; a controller connected with the light source system, the controller including a window control module connected with the first window, the second window and the third window of the light source system, the window control module being configured to control the first window and the second window to be opened and the third window to be closed, such that light emitted from the light source of the light source system exits from the first window and the second window during aligning the display panel to be cured, and configured to control the first window and the second window to be closed and the third window to be opened, such that light emitted from the light source exits from the third window during exposing the display panel to be cured.

According to yet another aspect of the present invention, a curing method of a display panel applicable to the ultraviolet curing device of the present embodiments. The curing method including: during aligning the display panel to be cured, opening the first window and the second window of the light source system of the ultraviolet curing device and closing the third window of the light source system such that light emitted from the light source assembly of the light source system exits from the first window and the second window, and selectively transmitting light in visible wave band in the light exiting from the first window and the second window and reflecting the light in visible wave band onto the display panel to be cured to supplement light for alignment of the display panel to be cured; and during exposing the display panel to be cured to light, closing the first window and the second window, and opening the third window such that light emitted from the light source assembly exits from the third window, and selectively transmitting light in ultraviolet wave band in the light exiting from the third window and projecting the light in ultraviolet wave band onto the display panel to be cured to cure sealant of the display panel to be cured.

BRIEF DESCRIPTION OF THE DRAWINGS

Embodiments of the present invention will be described in more detail below with reference to the accompanying drawings to enable those skilled in the art to understand the present invention more clearly, in which.

DETAILED DESCRIPTION

The technical solutions of the embodiments of the present disclosure will be described in a clearly and fully understandable way in connection with the drawings related to embodiments of the disclosure. Apparently, the described embodiments are just a part but not all of the embodiments of the disclosure. Based on the described embodiments herein, those skilled in the art can obtain other embodiment(s), without any inventive work, which shall fall within the protection scope of the present disclosure.

Unless otherwise defined, all the technical and scientific terms used herein have the same meanings as commonly understood by one of ordinary skill in the art to which the present disclosure belongs. The terms, such as "first," "second," or the like, which are used in the description and the claims of the present application, are not intended to indicate any sequence, amount or importance, but for distinguishing various components. Also, the terms, such as "a/an," "one," or the like, are not intended to limit the amount, but for indicating the existence of at lease one. The terms, such as "comprise/comprising," "include/including," or the like are intended to specify that the elements or the objects stated before these terms encompass the elements or the objects and equivalents thereof listed after these terms, but not preclude other elements or objects. The terms, "on," "under," or the like are only used to indicate relative position relationship, and when the position of the object which is described is changed, the relative position relationship may be changed accordingly.

In an ultraviolet curing device, different light source systems are used for alignment and ultraviolet exposure. During alignment, a cylinder is used to adjust the LED light supplement lamp to over the panel, and after alignment, the LED light supplement lamp needs to be adjusted to a position such that the ultraviolet exposure is not blocked. Since the LED light supplement lamp needs to reciprocate during the entire curing process, problems are often present. For example, the LED light supplement lamp is incapable of reaching the light supplement position, resulting a large probability of alignment alarm, failure to alignment, and even the device is required to restart, or the movement axis position of LED light supplement lamp is required to be initialized for normal operation. These would delay curing of the panel and cause bad yield.

Embodiment I

Figure 1:
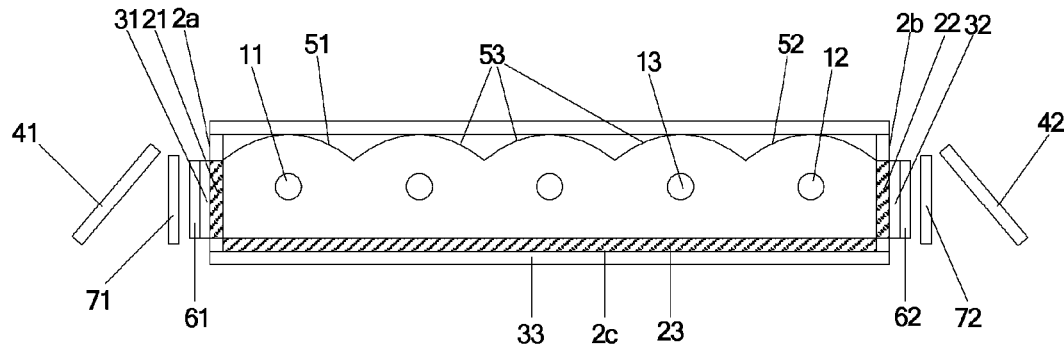
FIG. 1 is a sectional view showing a light source system applicable to display panel provided in embodiment I of the present invention.
Figure 2:
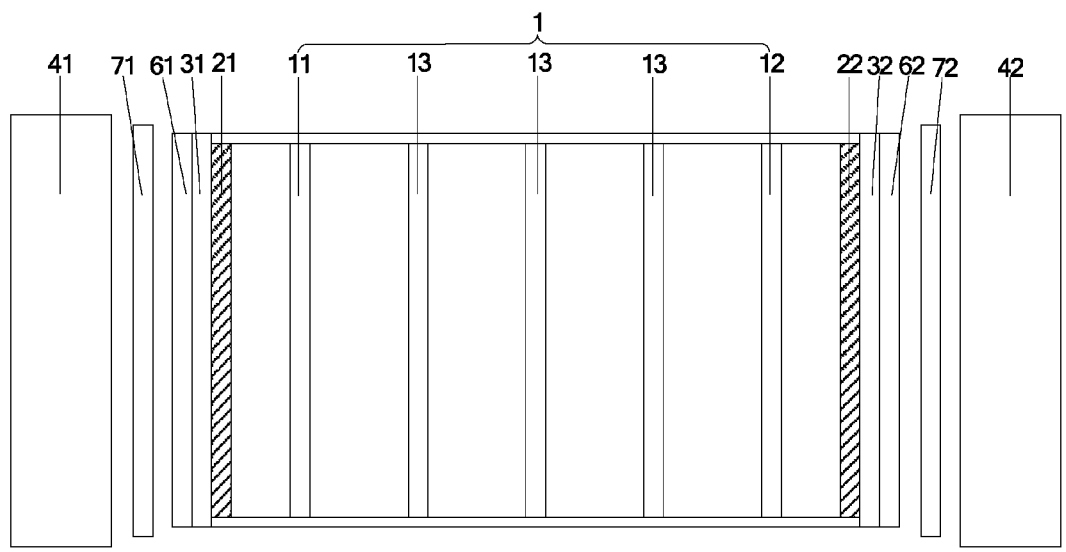
FIG. 2 is a top view showing a light source system applicable to display panel provided in embodiment I of the present invention.

The present embodiment provides a light source system applicable to a display panel. As shown in FIGS. 1 and 2, the light source system includes: a light source assembly 1 including at least one light source; a housing enclosing the light source assembly 1 and having a first face 2a, a second face 2b and a third face 2c. The first face 2a and the second face 2b are parallel to each other and both are perpendicular to the display panel to be cured. The first face 2a has a first window 21, the second face 2b has a second window 22, the third face 2c is parallel to the display panel to be cured and located between the light source assembly and the display panel to be cured, and the third face 2c has a third window 23. A first filter 31 covers the first window 21, a second filter 32 covers the second window 22 and a third filter 33 covers the third window 23. A first reflecting element 41 and a second reflecting element 42 are disposed outside the housing. The first reflecting element 41 has a reflecting face that is inclined toward the display panel to be cured relative to the first face 2a and has a vertical projection on the first face 2a with an area greater than or equal to that of the first window 21, and the second reflecting element 42 has a reflecting face that is inclined toward the display panel to be cured relative to the second face 2b and has a vertical projection on the second face 2b with an area greater than or equal to that of the second window 22.

Figure 3:
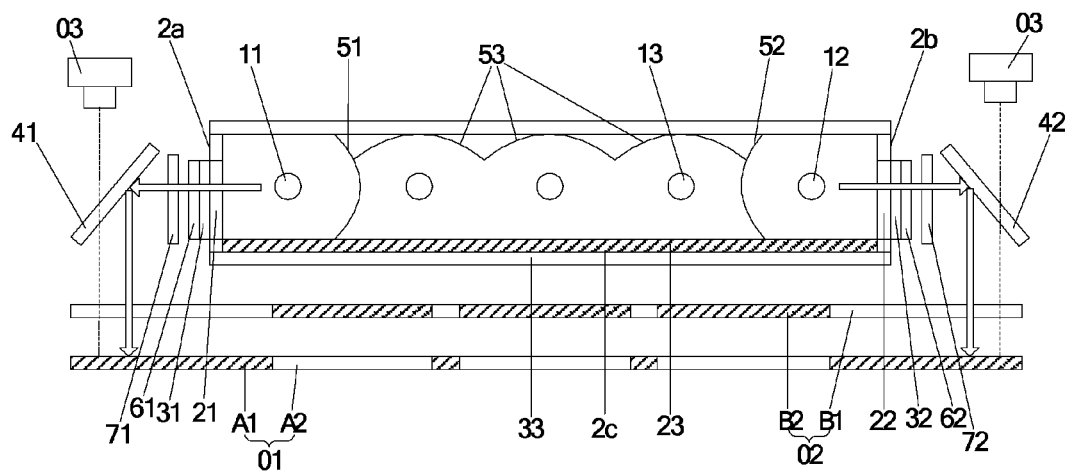
FIG. 3 is a light path diagram showing a light source system applicable to display panel provided in embodiment I of the present invention during alignment operation.

As shown in FIG. 3, during aligning the display panel 01 to be cured, the first window 21 and the second window 22 are opened, and the third window 23 is closed such that light emitted from the light source assembly 1 exits from the first window 21 and the second window 22. The first filter 31 selectively transmits light in visible wave band in the light exiting from the first window 21 and the second filter 32 selectively transmits light in visible wave band in the light exiting from the second window 22. The first reflecting element 41 and the second reflecting element 42 reflect light in the visible wave band onto the display panel 01 to be cured to supplement light for aligning the display panel 01 to be cured.

Figure 4:
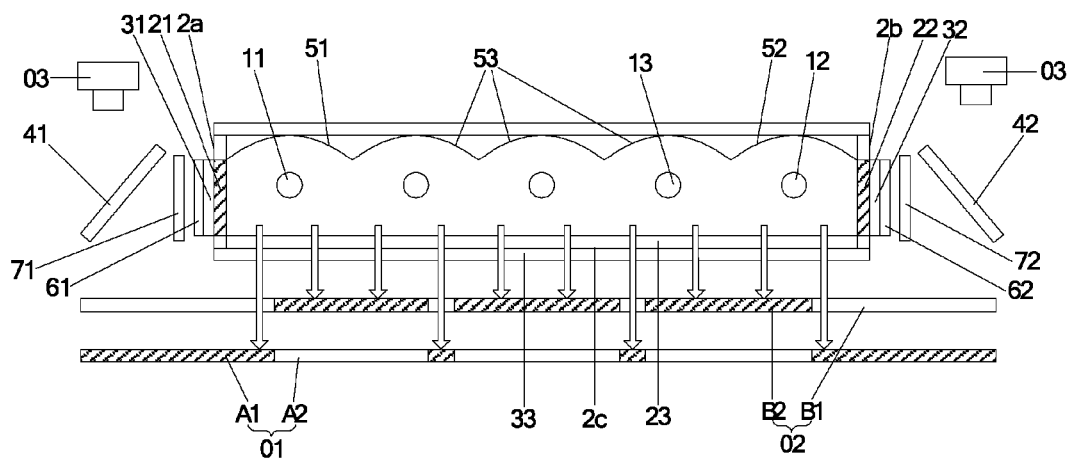
FIG. 4 is a light path diagram showing a light source system applicable to display panel provided in embodiment I of the present invention during exposure operation.

As shown in FIG. 4, during exposing the display panel 01 to be cured, the first window 21 and the second window 22 are closed and the third window 23 is open, such that light emitted from the light source assembly 1 exits from the third window 23. The third filter 33 selectively transmits light in ultraviolet wave band in the light exiting from the third window 23 to project it onto the display panel 01 to be cured to cure sealant of the display panel 01 to be cured.

In the above-mentioned device, the first window 21, the second window 22 and the third window 23 can be open or close and their structure may be similar to a structure of a door or window. The first filter 21 and the second filter 22 can filter light such that only light in visible wave band are allowed to pass, and the third filter 23 can filter light such that only light in ultraviolet wave band is allowed to pass. These three filters may be attached inside or outside the windows on the housing accordingly. For example, the first filter 31, the second filter 32 and the third filter 33 may be all positioned inside the housing or outside the housing.

In the present embodiment, the side where the third face 2c is located is referred to as under the housing, the side opposite to the third face 2c is referred to as over the housing, and the four faces perpendicular to the third face 2c are side faces of the housing, which include the first face 2a and the second face 2b.

When the first window 21 and the second window 22 are open while the third window 23 is closed, the housing forms a space with the top, bottom and two opposite sides close and two other opposite sides open, that is, the housing is open toward only two sides such that light can only exit from the first window 21 and the second window 22. The light emitted from the light source assembly 1 includes light of full wave band. In order to prevent light in ultraviolet wave band from influencing sealant when supplementing light for alignment, emitted light should be filtered with the first filter 31 and the second filter 32 to filter off light in wave band unwanted for light supplement, such as light in ultraviolet wave band, and leave light in visible wave band. Most part of the light exiting from the first window 21 and the second window 22 is parallel to or nearly parallel to the display panel 01 to be cured. To allow the light to be transmitted onto the display panel 01 to be cured perpendicularly as much as possible, it is possible to use the first reflecting element 41 and the second reflecting element 42 to change the propagation direction of the exiting light such that light is reflected to the display panel 01 to be cured, realizing the light supplement for aligning the display panel 01 to be cured and a mask 02 and providing sufficient luminance for the image sensor CCD 03 to capture alignment marks on the display panel 01 to be cured and the mask 02. After completing the alignment, a blocking zone B2 on the mask 02 just blocks a display area A2 of the display panel 01 to be cured and a transmitting zone B1 on the mask 02 just blocks a margin frame area A1 of the display panel 01 to be cured.

When the first window 21 and the second window 22 are closed while the third window 23 is open, the housing forms a space with the top and four side faces closed and the bottom open, that is, the housing is open only toward the display panel 01 to be cured such that light can only exit from the third window 23. Light required for exposure and curing is light in ultraviolet wave band. The exiting light should be filtered with the third filter 33 to filter off light in wave band unwanted for exposure, such as light in visible wave band, and leave light in ultraviolet wave band. The light is projected downward vertically after transmitting through the third window 23. Light projected onto a blocking zone B2 on the mask 02 is blocked due to the blockage of the mask 02, and light projected onto a transmitting zone B1 of the mask 02 is projected onto the margin frame area A1 of the display panel 01 to be cured after transmitting through the mask 02 so as to expose and cure sealant at the margin frame area.

In the light source system provided in the present embodiment, the light supplement light source for alignment and the ultraviolet source for exposure and curing are from a same light source during the curing process. The light source assembly 1 is stationary during alignment and exposure operations are performed, and needs not to reciprocate as the light supplement lamp in prior art, thereby avoiding the alignment alarm problem caused by the light supplement lamp that can not reach the light supplement position, reducing the probability of alignment alarm, and enabling timely curing of the panel, and the yield of the panels is increased.

Furthermore, in the light source system provided in the present embodiment, the light supplement lamp required for alignment is omitted, which is advantageous for reducing costs and saving energy.

It is noted that in practical production, the display panel 01 to be cured is typically an overall panel including a plurality of panel units, and each panel unit includes a display area A2 and a margin frame area A1 surrounding the display area A2, therefore the cross section of the display panel 01 to be cured shown in FIGS. 2 and 3 is a structure with alternatively arranged display area A2 and margin frame area A1 and the corresponding mask 02 is also a structure with alternatively arranged blocking zone B2 and transmitting zone B1.

In addition, since during alignment, it is not required to align the display area A2 of each panel unit and the blocking zone B2 of the mask 02, and it is only required to align edges of the display panel 01 to be cured and the mask 02 that are closest to the peripheral, such as the diagonal positions of the display panel 01 to be cured and the mask 02, extracting light emitted from the light source assembly 1 from opposite sides in the present embodiment can satisfy the light supplemental requirements at the alignment position.

Furthermore, since alignment marks on the display panel 01 to be cured and the mask 02 are typically at the outer side of the frame sealant to be cured, projecting light from both sides onto the display panel 01 to be cured for alignment allows the light to irradiate on the alignment marks.

In the light source system provided in the present embodiment, the light source assembly 1 includes at least two light sources, such as ultraviolet lamps. The light sources may be of a strip shape structure and disposed in parallel to the first face 2a and the second side 2b. Based on this scheme, the light source in the light source assembly 1 that is closest to the first window 21 is referred to as a first light source 11, and the light source that is closest to the second window 22 is referred to as a second light source 12. For example, the light source system provided in the present embodiment may further include: a third reflecting element 51 and a fourth reflecting element 51 disposed inside the housing. The third reflecting element 51 has a reflecting surface in cambered shape that is bent toward the first light source 11, and the fourth reflecting element 52 has a reflecting surface in a cambered shape that is bent toward the second light source 12.

As shown in FIG. 3, during aligning the display panel 01 to be cured, the third reflecting element 51 is moved to a position such that its reflecting surface faces the first window 21 so as to reflect light emitted by the first light source 11 to the first window 21, and the fourth reflecting element 52 is moved to a position such that its reflecting surface faces the second window 22 so as to reflect light emitted by the second light source 12 to the second window 22, thereby increasing the amount of light exiting from the first window 21 and the second window 22 during the alignment, effectively increasing light utilization ratio and facilitating speeding up the alignment.

As shown in FIG. 4, during exposing the display panel 01 to be cured, the third reflecting element 51 is moved to a position such that its reflecting surface faces the third window 23 so as to reflect light emitted by the first light source 11 to the third window 23, and the fourth reflecting element 52 is moved to a position such that its reflecting surface faces the third window 23 so as to reflect light emitted by the second light source 12 to the third window 23, thereby increasing the amount of light exiting from the third window 23 during the exposure, significantly increasing light utilization ratio and facilitating speeding up the alignment.

In order to further improve light utilization ratio during exposure, in the present embodiment, if at least one light source 13 is further included between the first light source 11 and the second light source 12, it is further possible to add elements in the light source system including at least one stationary reflecting element 53 one by one corresponding to the at least one light source 13 between the first light source 11 and the second light source 12. The stationary reflecting element 53 has a reflecting surface in cambered shape that is bent toward the corresponding light source 13 and the third window 23 such that it can reflect light emitted by the corresponding light source 13 to the third window 23.

It is noted that in case the light source system includes at least 3 light sources, the at least 3 light sources include a first light source 11 closest to the first window 21, a second light source 12 closest to the second window 22, and at least one light source 13 between the first light source 11 and the second light source 12. In this way, it is possible to keep all light sources, namely the first light source 11, the second light source 12 and the at least one light source 13 emitting light continuously during the whole curing process (i.e., alignment and curing process), which simplifies the control process of the light source system. It is also possible to shut down the light source 13 during alignment and turn on only the first light source 11 and the second light source 12, while turn on all the light sources during exposure so that energy is saved.

In the present embodiment, the light source system may further include, for example: a first light guiding plate 61 covering the first window 21 and a second light guiding plate 62 covering the second window 22. During aligning the display panel 01 to be cured, the first light guiding plate 61 may uniform the light exiting from the first window 21, and the second light guiding plate 62 may uniform the light exiting from the second window 22, such that the light can irradiate onto the display panel 01 to be cured uniformly, and CCD 03 can capture alignment marks more accurately, which is in favor of improving alignment accuracy and speed.

It is noted that the first light guiding plate 61 and the second light guiding plate 62 may be, for example, attached inside or outside the windows on the housing accordingly. For example, both may be located inside the housing or outside the housing. In addition, the first light guiding plate 61 and the first filter 31 may be superimposed on the same side of the first window 21 of the housing (inside or outside the housing), or on two sides of the first window 21, respectively; and the second light guiding plate 62 and the second filter 32 may be superimposed on the same side of the second window 22 of the housing or on two sides of the second window 22, respectively.

For example, it is also possible to add a first light intensity regulator 71 between the housing and the first reflecting element 41 and add a second light intensity regulator 72 between the housing and the second reflecting element 42. During aligning the display panel 01 to be cured, the first light intensity regulator 71 regulates the intensity of the light exiting from the first window 21 to the light intensity required for supplementing light, and the second light intensity regulator 72 regulates the intensity of the light exiting from the second window 22 to the light intensity required for supplementing light, so as to enhance the speed with which CCD 03 captures images of alignment marks and in turn increase the alignment speed.

The reflecting surfaces of the first reflecting element 41 and the second reflecting element 42 in the light source system may both be, for example, flat surfaces. Since the first face 2a and the second side 2b of the housing of light source system are both perpendicular to the display panel 01 to be cured, it is possible to set the included angles respectively between the first reflecting element 41, the second reflecting element 42 and the display panel 01 to be cured to be 45 degree, so as to convert the direction of the light exiting from the first window 21 and the second window 22 from parallel to the display panel 01 to be cured to perpendicular to the display panel 01 to be cured.

During aligning the display panel 01 to be cured, if CCD 03 for capturing alignment marks on the display panel 01 to be cured and the light source system are located on two sides of the display panel 01 to be cured, the first reflecting element 41 and the second reflecting element 42 would not block CCD 03 for capturing alignment marks on the display panel 01 to be cured, and both of them can be reflecting mirrors. If CCD 03 and the light source system are located on a same side of the display panel 01 to be cured, in order to prevent the first reflecting element 41 and the second reflecting element 42 from blocking CCD 03 for capturing alignment marks on the display panel 01 to be cured, the first reflecting element 41 and the second reflecting element 42 may both be transflective mirrors.

Embodiment II

Figure 5:
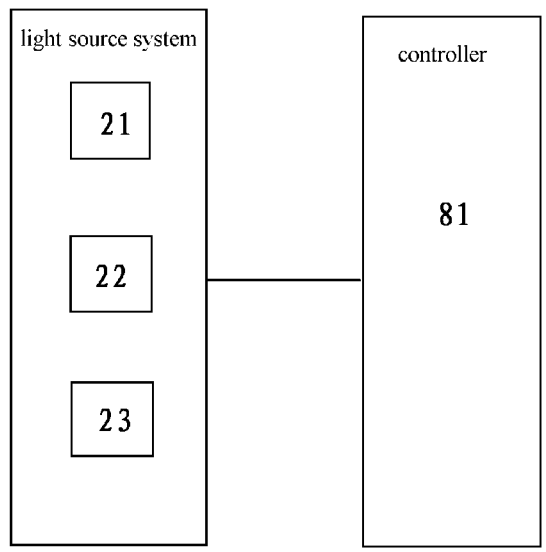
FIG. 5 is a functional module diagram of an ultraviolet curing device provided in an example of embodiment II of the present invention.

The present embodiment provides an ultraviolet curing device applicable to display panels, as shown in FIG. 5. The ultraviolet curing device includes a light source system provided in embodiment I; a controller connected with the light source system, which includes a window control module 81 connected with the first window 21, second window 22 and third window 23 of the light source system for controlling the first window 21 and the second window 22 to be open and the third window 23 to be closed during aligning the display panel 01 to be cured such that the light emitted from the light source assembly 1 of the light source system exits from the first window 21 and the second window 22; and controlling the first window 21 and second window 22 to be closed and the third window 23 to be open during exposing the display panel 01 to be cured such that the light emitted from the light source assembly 1 exits from the third window 23.

In the ultraviolet curing device in the present embodiment, compared to the prior art in which the light source reciprocates for alignment and exposure, the light source system of the present embodiment for supplementing light and exposure is the same one, and the light source in the light source system is stationary, which eliminates the alarm problem caused by the light supplement lamp incapable of reaching light supplementing position, enables the panel to be cured in time, and simplifies the device structure, and thus the number of light sources used is reduced.

For the above-mentioned ultraviolet curing device, for example, the structure of its light source system may be as follows. The light source assembly 1 includes two light sources that are of strip-like structure and disposed parallel to the first face 2a and the second face 2b, in which the light source closest to the first face 2a in the light source assembly 1 is the first light source 11, and the light source closest to the second face 2b is the second light source 12. The light source system further includes: a third reflecting element 51 and a fourth reflecting element 52 disposed inside the housing, in which the third reflecting element 51 has a reflecting surface in a cambered shape that is bent toward the first light source 11, and the fourth reflecting element 52 has a reflecting surface in a cambered shape that is bent toward the second light source 12.

Figure 6:
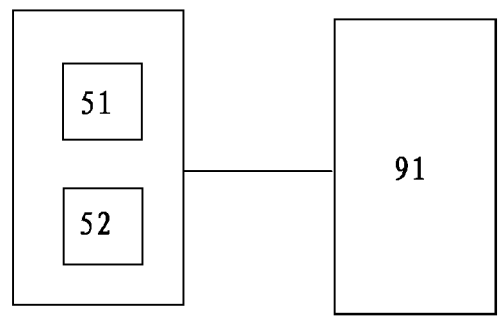
FIG. 6 is a functional module diagram of a part of an ultraviolet curing device provided in another example of embodiment II of the present invention.

Corresponding to the illustrative structure of the above-mentioned light source system, the controller may further include a displacement control module 91 connected with the third reflecting element 51 and the fourth reflecting element 52, as shown in FIG. 6. The displacement control module 91 is configured to, during aligning the display panel 01 to be cured, control the third reflecting element 51 to move to a position such that its reflecting surface faces the first window 21 so that the third reflecting element 51 reflects the light emitted by the first light source 11 to the first window 21, and control the fourth reflecting element 52 to move to a position such that its reflecting surface faces the second window 22 so that the fourth reflecting element 52 reflects the light emitted by the second light source 12 to the second window 22. During exposing the display panel 01 to be cured, the displacement control module 91 controls the third reflecting element 51 to move to a position such that its reflecting surface faces the third window 23 so that the third reflecting element 51 reflects the light emitted by the first light source 11 to the third window 23, and control the fourth reflecting element 52 to move to a position such that its reflecting surface faces the third window 23 so that the fourth reflecting element 52 reflects the light emitted by the second light source 12 to the third window 23.

By providing the third reflecting element 51 and the fourth reflecting element 52 with reflecting surfaces in a cambered shape and the displacement control module for controlling movements of them, it is possible to allow the third reflecting element 51 and the fourth reflecting element 52 to face the corresponding light sources and the windows from which the light exits during supplementing light in alignment and exposure for curing, so as to significantly increase the light extraction efficiency and facilitate speeding up alignment speed.

Figure 7:
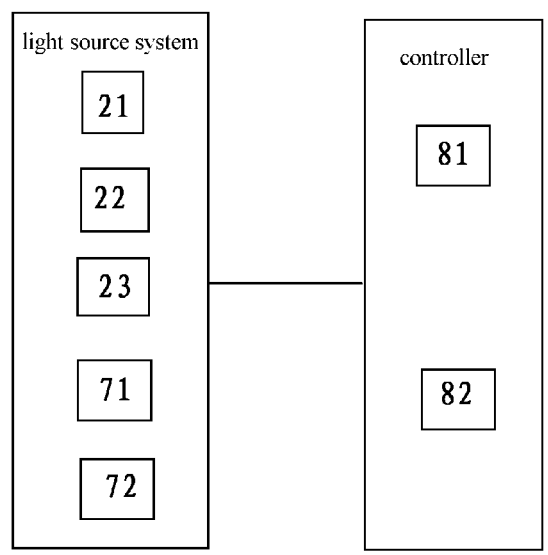
FIG. 7 is a functional module diagram of an ultraviolet curing device provided in yet another example of embodiment II of the present invention.

In order to improve the speed at which CCD 03 captures alignment marks and in turn increase alignment speed, in the present embodiment, the light source system of the ultraviolet curing device may further include, for example, a first light intensity regulator 71 disposed between the housing and the first reflecting element 41, and a second light intensity regulator 72 disposed between the housing and the second reflecting element 42. Accordingly, a light intensity regulating module 82 connected with the first light intensity regulator 71 and the second light intensity regulator 72 is added in the controller, as shown in FIG. 7. The light intensity regulating module 82 is configured to, during aligning the display panel 01 to be cured, control the first light intensity regulator 71 to regulate the intensity of the light exiting from the first window 21 to the light intensity required for supplementing light, and control the second light intensity regulator 72 to regulate the intensity of the light exiting from the second window 22 to the light intensity required for supplementing light.

Embodiment III

The present embodiment provides a curing method applicable to a display panel that is applicable to the ultraviolet curing device provided in embodiment II, which includes the following steps.

In step S1, the display panel 01 to be cured is aligned.

The first window 21 and second window 22 of the light source system in the ultraviolet curing device are opened and the third window 23 of the light source system is closed such that light emitted from the light source assembly 1 of the light source system exits from the first window 21 and second window 22. Light in visible wave band in the light exiting from the first window 21 and the second window 22 is selectively transmitted and reflected onto the display panel 01 to be cured to supplement light for alignment of the display panel 01 to be cured.

During the alignment, positions of respective alignment marks on the display panel 01 to be cured and mask 02 are captured by CCD 03, and positions of the display panel 01 to be cured and/or the mask 02 are adjusted according to the alignment of the alignment marks of the display panel 01 and the mask 2 until the alignment marks of both completely overlap with each other, so as to complete the alignment.

In this step, the light exiting from the first window 21 and the second window 22 may experience some optical processing such that parameters of the light, such as utilization ratio, uniformity and intensity, satisfy requirements on the light for the CCD 03 to capture alignment marks in more advantageous way, so as to improve alignment speed and reduce the production time.

For example, if the light source assembly 1 includes at least two light sources that are of strip-like structure and disposed parallel to the first face 2a and the second face 2b, the light source closest to the first face 2a in the light source assembly 1 is the first light source 11, and the light source closest to the second face 2b is the second light source 12. The light source system further includes: a third reflecting element 51 and a fourth reflecting element 52 disposed inside the housing, in which the third reflecting element 51 has a reflecting surface in a cambered shape that is bent toward the first light source 11, and the fourth reflecting element 52 has a reflecting surface in a cambered shape that is bent toward the second light source 12. Then, during the alignment, it is possible to move the third reflecting element 51 to a position such that its reflecting surface faces the first window 21 so that the third reflecting element 51 reflects the light emitted by the first light source 11 to the first window 21, and move the fourth reflecting element 52 to move to a position such that its reflecting surface faces the second window 22 so that the fourth reflecting element 52 reflects the light emitted by the second light source 12 to the second window 22, so as to increase the utilization ratio of the light and enhance the light intensity for supplementing light.

As another example, it is possible to cover the first window 21 with a first light guiding plate 61, and cover the second window 22 with a second light guiding plate 62 to improve uniformity of the light exiting from the first window 21 and the second window 22 and in turn increase accuracy and speed of the alignment.

As yet another example, if a first light intensity regulator 71 is disposed between the housing of the light source system and the first reflecting element 41 and a second light intensity regulator 72 is disposed between the housing and the second reflecting element 42, it is possible to regulate the intensity of the light exiting from the first window 21 by the first light intensity regulator 71 to the light intensity required for supplementing light during the alignment, and regulate the intensity of the light exiting from the second window 22 by the second light intensity regulator 72 to the light intensity required for supplementing light, so as to realize the purpose of increasing the alignment speed.

In step S2, the display panel 01 to be cured having been aligned is exposed to light.

The first window 21 and second window 22 are closed, and the third window 23 is opened such that light emitted from the light source assembly 1 exits from the third window 23 and light in ultraviolet wave band in the light exiting from the third window 23 is selectively transmitted to project light in ultraviolet wave band onto the display panel 01 to be cured so as to cure sealant of the display panel 01 to be cured.

In this step, if the number of the light sources is at least two, light sources are of strip-like structure and disposed parallel to the first face 2a and second side 2b, the light source in the light source assembly 1 that is closest to the first window 21 is the first light source 11, and the light source closest to the second window 22 is the second light source 12. During the exposure, the ultraviolet curing device including the third reflecting element 51 and the fourth reflecting element 52 may move the third reflecting element 51 to a position such that its reflecting surface faces the third window 23 and enables the third reflecting element 51 to reflect the light emitted from the first light source 11 to the third window 23, and move the fourth reflecting element 52 to a position such that its reflecting surface faces the third window 23 and enables the fourth reflecting element 52 to reflect the light emitted from the second light source 12 to the third window, so as to increase amount of the light exiting from the third window 23, enhance the exposure light intensity and cure the sealant rapidly.

In the light source system, the ultraviolet curing device, and the curing method of a display panel provided in the embodiments of the present invention, the light supplement light source for alignment and the ultraviolet source for exposure and curing are from a same light source during the curing process. The light source assembly is stationary during alignment and exposure operations are performed, and needs not to reciprocate as the light supplement lamp in prior art, thereby avoiding the alignment alarm problem caused by the light supplement lamp that can not reach the light supplement position, reducing the probability of alignment alarm, and enabling timely curing of the panel, and the yield of the panels is increased.

It is understood that the described above are only illustrative implementation or embodiments for explaining the principle of the present invention, but the present invention is not limited thereto. A person of ordinary skill in the art can make various modifications and improvements without departing from the spirit and nature of the present invention which shall fall within the scope of the present invention.

The present application claims priority of Chinese patent application No. 201410541786.8 titled "light source system, ultraviolet curing device and curing method applicable to display panel" filed on Oct. 14, 2014, which is incorporated in its entirety herein by reference.

What is claimed is:

1. A light source system applicable to a display panel, comprising:
   a light source assembly;
   a housing enclosing the light source assembly and having a first face, a second face and a third face, the first face and the second face being parallel to each other and both perpendicular to the display panel to be cured, the first face having a first window, the second face having a second window, the third face being parallel to the display panel to be cured and located between the light source assembly and the display panel to be cured, and the third face having a third window;
   a first filter covering the first window, a second filter covering the second window and a third filter covering the third window; and
   a first reflecting element and a second reflecting element disposed outside the housing, the first reflecting element having a reflecting surface inclined toward the display panel to be cured relative to the first face and having a vertical projection on the first face with an area greater than or equal to that of the first window, and the second reflecting element having a reflecting surface inclined toward the display panel to be cured relative to the second face and having a vertical projection on the second face with an area greater than or equal to that of the second window.

2. The light source system according to claim 1, wherein the light source assembly comprises at least two light sources having strip-like structure and disposed parallel to the first face and the second face.

3. The light source system according to claim 2, wherein the at least two light sources include a first light source and a second source, wherein the first light source is provided closest to the first window, and the second light source is provided closest to the second window, the light source system further comprises a third reflecting element and a fourth reflecting element disposed inside the housing, wherein the third reflecting element has a reflecting surface in a cambered shape and bent toward the first light source, and the fourth reflecting element has a reflecting surface in a cambered shape and bent toward the second light source.

4. The light source system according to claim 3, wherein the light source assembly further comprises at least one light source located between the first light source and the second light source, the light source system further comprises at least one stationary reflecting element disposed one by one corresponding to the at least one light source between the first light source and the second light source, the at least one stationary reflecting element has a reflecting surface in a cambered shape and bent toward the corresponding light source and the third window so as to reflect the light emitted from the corresponding light source to the third window during exposing the display panel to be cured to light.

5. The light source system according to claim 1, further comprising, a first light guiding plate covering the first window and a second light guiding plate covering the second window.

6. The light source system according to claim 1, further comprising, a first light intensity regulator disposed between the housing and the first reflecting element, and a second light intensity regulator disposed between the housing and the second reflecting element;
   wherein the first light intensity regulator is configured to regulate the intensity of the light exiting from the first window to a light intensity required for the supplementing light, and the second light intensity regulator is configured to regulate the intensity of the light exiting from the second window to a light intensity required for the supplementing light during aligning the display panel to be cured.

7. The light source system according to claim 1, wherein the first filter, the second filter and the third filter are located inside the housing; or,
   the first filter, the second filter and the third filter are located outside the housing.

8. The light source system according to claim 1, wherein both of the first reflecting element and the second reflecting element have reflecting surfaces being flat surfaces, and the included angle respectively between the first reflecting element, the second reflecting element and the display panel to be cured is 45 degrees.

9. The light source system according to claim 8, wherein, if an image sensor for capturing alignment marks on the display panel to be cured and the light source system are located on two sides of the display panel to be cured, both of the first reflecting element and the second reflecting element are reflecting mirrors during aligning the display panel to be cured; and
   if an image sensor for capturing alignment marks on the display panel to be cured and the light source system are located on a same side of the display panel to be cured, both of the first reflecting element and the second reflecting element are transflective mirrors during aligning the display panel to be cured.

10. An ultraviolet curing device applicable to a display panel, comprising:
    a light source system, the light source system comprising:
    a light source assembly;
    a housing enclosing the light source assembly and having a first face, a second face and a third face, the first face and the second face being parallel to each other and both perpendicular to the display panel to be cured, the first face having a first window, the second face having a second window, the third face being parallel to the display panel to be cured and located between the light source assembly and the display panel to be cured, and the third face having a third window;
    a first filter covering the first window, a second filter covering the second window and a third filter covering the third window;
    a first reflecting element and a second reflecting element disposed outside the housing, the first reflecting element having a reflecting surface inclined toward the display panel to be cured relative to the first face and having a vertical projection on the first face with an area greater than or equal to that of the first window, and the second reflecting element having a reflecting surface inclined toward the display panel to be cured relative to the second face and having a vertical projection on the second face with an area greater than or equal to that of the second window; and a controller connected with the light source system, the controller comprising a window control module connected with the first window, the second window and the third window of the light source system, the window control module being configured to control the first window and the second window to be open, and the third window to be closed such that the light emitted from the light source of the light source system exits from the first window and the second window; or, control the first window and the second window to be closed and the third window to be open, such that the light emitted from the light source exits from the third window.

11. The ultraviolet curing device according to claim 10, wherein the light source assembly comprises at least two light sources including a first light source and a second light source therein, which have strip-like structure and disposed parallel to the first face and the second face of the light source system, wherein the first light source is provided closest to the first face, and the second light source is provided closest to the second face; the light source system further comprises a third reflecting element and a fourth reflecting element disposed inside the housing, wherein the third reflecting element has a reflecting surface in a cambered shape and bent toward the first light source, and the fourth reflecting element has a reflecting surface in a cambered shape and bent toward the second light source; and the controller further comprises a displacement control module connected with the third reflecting element and the fourth reflecting element, the displacement control module being configured to control the third reflecting element to move to a position such that its reflecting surface faces the first window so that the third reflecting element reflects the light emitted by the first light source to the first window, and control the fourth reflecting element to move to a position such that its reflecting surface faces the second window so that the fourth reflecting element reflects the light emitted by the second light source to the second window; or, control the third reflecting element to move to a position such that its reflecting surface faces the third window so that the third reflecting element reflects the light emitted by the first light source to the third window, and control the fourth reflecting element to move to a position such that its reflecting surface faces the third window so that the fourth reflecting element reflects the light emitted by the second light source to the third window.

12. The ultraviolet curing device according to claim 10, wherein the light source system further comprises a first light intensity regulator disposed between the housing and the first reflecting element, and a second light intensity regulator disposed between the housing and the second reflecting element; and the controller further comprises a light intensity regulating module connected with the first light intensity regulator and the second light intensity regulator, the light intensity regulating module being configured to control the first light intensity regulator to regulate the intensity of the light exiting from the first window to a light intensity required for the supplementing light, and control the second light intensity regulator to regulate the intensity of the light exiting from the second window to a light intensity required for the supplementing light.

13. A curing method of a display panel applicable to the ultraviolet curing device of claim 10, the curing method comprising:

during aligning the display panel to be cured, opening the first window and the second window of the light source system of the ultraviolet curing device and closing the third window of the light source system such that the light emitted from the light source assembly of the light source system exits from the first window and the second window, and selectively transmitting light in visible wave band in the light exiting from the first window and the second window and reflecting the light in visible wave band onto the display panel to be cured to supplement light for alignment of the display panel to be cured; and during exposing the display panel to be cured to light, closing the first window and the second window, and opening the third window such that the light emitted from the light source assembly exits from the third window, and selectively transmitting light in ultraviolet wave band in the light exiting from the third window and projecting the light in ultraviolet wave band onto the display panel to be cured to cure sealant of the display panel to be cured.

14. The curing method according to claim 13, wherein the light source assembly comprises at least two light sources having strip-like structure and disposed parallel to the first face and the second face of the light source system, in the light source assembly, a light source closest to the first face is a first light source, a light source closest to the second face is a second light source, the light source system further comprises a third reflecting element and a fourth reflecting element disposed inside the housing, the third reflecting element has a reflecting surface in a cambered shape and bent toward the first light source, and the fourth reflecting element has a reflecting surface in a cambered shape and bent toward the second light source, the curing method further comprises:

during aligning the display panel to be cured, moving the third reflecting element to a position such that its reflecting surface faces the first window so that the third reflecting element reflects the light emitted by the first light source to the first window, and moving the fourth reflecting element to a position such that its reflecting surface faces the second window so that the fourth reflecting element reflects the light emitted by the second light source to the second window; and during exposing the display panel to be cured, moving the third reflecting element to a position such that its reflecting surface faces the third window so that the third reflecting element reflects the light emitted by the first light source to the third window, and moving the fourth reflecting element to a position such that its reflecting surface faces the third window so that the fourth reflecting element reflects the light emitted by the second light source to the third window.

15. The curing method according to claim 13, wherein the light source system further comprises a first light intensity regulator disposed between the housing and the first reflecting element, and a second light intensity regulator disposed between the housing and the second reflecting element, the curing method further comprises:

during aligning the display panel to be cured, regulating the intensity of the light exiting from the first window to a light intensity required for the supplementing light, and regulating the intensity of the light exiting from the second window to a light intensity required for the supplementing light.

16. The light source system according to claim 1, wherein the light source assembly includes a first light source and a second light source, the first light source is provided closest to the first window, and the second light source is provided closest to the second window, and the light source system further comprises a third reflecting element and a fourth reflecting element disposed inside the housing, wherein the third reflecting element has a reflecting surface in a cambered shape and bent toward the first light source, and the fourth reflecting element has a reflecting surface in a cambered shape and bent toward the second light source.

17. The light source system according to claim 1, wherein the light source assembly further comprises at least one light source located between the first light source and the second light source, the light source system further comprises at least one stationary reflecting element disposed one by one corresponding to the at least one light source between the first light source and the second light source, the at least one stationary reflecting element has a reflecting surface in a cambered shape and bent toward the corresponding light source and the third window so as to reflect the light emitted from the corresponding light source to the third window during exposing the display panel to be cured to light.

18. The light source system according to claim 2, wherein the light source assembly further comprises at least one light source located between the first light source and the second light source, the light source system further comprises at least one stationary reflecting element disposed one by one corresponding to the at least one light source between the first light source and the second light source, the at least one stationary reflecting element has a reflecting surface in a cambered shape and bent toward the corresponding light source and the third window so as to reflect the light emitted from the corresponding light source to the third window during exposing the display panel to be cured to light.

19. The light source system according to claim 2, further comprising, a first light guiding plate covering the first window and a second light guiding plate covering the second window.

20. The light source system according to claim 3, further comprising, a first light guiding plate covering the first window and a second light guiding plate covering the second window.

* * * * *